United States Patent Office 3,475,511
Patented Oct. 28, 1969

3,475,511
BUTENE-2 ISOMERIZATION
Harold E. Manning, Houston, Tex., assignor to Petro-Tex Chemical Corporation, Houston, Tex., a corporation of Delaware
No Drawing. Filed Oct. 2, 1967, Ser. No. 671,999
Int. Cl. C07c 5/30
U.S. Cl. 260—683.2
15 Claims

ABSTRACT OF THE DISCLOSURE

A process for the isomerization of butene-2 to butene-1 characterized inter alia by contacting the butene-2 at a temperature from about 320° C. to about 650° C. with a catalyst comprised of a zeolite, either synthetic or natural.

BACKGROUND OF THE INVENTION

This invention relates to a novel process for the isomerization of butene-2 to butene-1 in the presence of zeolite catalysts under controlled conditions.

Adsorbents which behave as "molecular sieves" have been used extensively for effecting physical separations of mixtures of materials of varying molecular size. Recently a considerable volume of work has been directed to the development of molecular sieves for catalytic activity. Frilette et al. in U.S. Patent 3,140,322 and Rabo et al. in U.S. Patent 3,236,761 have disclosed processes involving the use of zeolite catalysts for the conversion, hydrocracking, and isomerization of various hydrocarbon compounds. The present invention concerns specifically the isomerization of butene-2 to butene-1 wherein the isomerization is conducted in the presence of zeolite catalysts at specified temperatures.

As is well known, "molecular sieves" are essentially the dehydrated forms of crystalline, natural or synthetic, hydrosiliceous eolites which contain various quantities of sodium, calcium, and aluminum with or without other metals. All, or a portion of the sodium or calcium ions normally contained in the molecular sieve structure may be zeolitically replaced with a number of various ions. The atoms of sodium, calcium, or metals in replacement of each, silicon, aluminum, and oxygen in these zeolites are arranged in the form of aluminosilicate salts having definite and consistent crystalline patterns. The crystalline structures of these aluminosilicate salts contain large numbers of small cavities interconnected by numbers of still smaller holes or channels. These cavities and channels are precise in form and size and are generally occupied by molecules of water of hydration. When the water of hydration is driven off, the crystal does not collapse or rearrange, as is the case with most other hydrated materials. Instead, the physical structure of the crystal remains unchanged, which results in a network of empty pores and cavities that comprise about one-half of the total volume of the crystals.

Natural zeolites include such materials as chabazite, faujasite, mordenite, heulandite, phillipsite, gmelinite and levynite. At the present time, there are several molecular sieves commercially available. These zeolites may be designated as being of an "A" or of an "X" series. A zeolite type known as molecular sieve 4A is a crystalline metal-aluminosilicate having interstices or molecular pores of about 4 angstroms in diameter. The zeolite type known as molecular sieve 5A is an aluminosilicate salt having interstices of about 5 angstroms in diameter and in which the bulk of the metallic ions other than aluminum comprise calcium, it being understood that calcium replaces any univalent metal in the ratio of one calcium ion for two univalent ions in order to preserve charge neutrality. The designations 10X and 13X refer to zeolite types having channel dimensions of about 10 angstroms and 13 angstroms in diameter respectively, but which have a somewhat different crystal structure than the "A" type structure. For purposes of this invention, the particular zeolite employed does not appear to be especially critical, however, those of the "A" type, i.e., 4A and 5A, are preferred. Both synthetic and natural zeolites are adaptable to use in the method of the invention. The chemical composition of many zeolites may be expressed by the formula

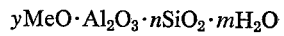

$$y\text{MeO} \cdot \text{Al}_2\text{O}_3 \cdot n\text{SiO}_2 \cdot m\text{H}_2\text{O}$$

where Me is a univalent cation ($Na^+$, $K^+$, $Li^+$) or a divalent cation ($Ca^{+2}$, $Sr^{+2}$, $Ba^{2+}{}_1$) and $y$, $n$ and $m$ designate varying proportions of the MeO moiety, the $SiO_2$ moiety, and water molecules respectively. For example, $y$ may vary from .8 to 2, $n$ may vary from .8 to 6, and $m$ from 0 to 254, depending on the zeolites considered and temperatures involved. A general formula for type 4A is 0.9 to 1.2 $Na_2O \cdot 0.9$ to 1.2 $Al_2O_3 \cdot 1.83$ to 2.1 $SiO_2 \cdot mH_2O$, the size of $m$ depending on the amount of moisture present and varying from 0 to 32. Type 5A may be produced from 4A by ion exchange of about 75% of the sodium ions by calcium ions. A general formula for type 13X is 0.78 to 0.83 $Na_2O \cdot 0.9$ to 1.2. $Al_2O_3 \cdot 2.45$ to 2.51 $SiO_2 \cdot mH_2O$ where $m$ varies from 0 to 32. The preparation of the zeolites in synthetic form for use in the invention forms no part of the present invention but rather, is carried out in accordance with well established procedures in the art. For example, U.S. Patent 3,140,322 discloses a manner of preparation of zeolites of a type suitable for use in the present invention.

SUMMARY OF THE INVENTION

It has been found that butene-2 undergoes isomerization in good yields if the material is contacted with a zeolite catalyst at a temperature of from about 320° C. to about 650° C. The catalysts and process conditions of the invention as disclosed herein permit improved yields of butene-1 with shortened contact time and high liquid hourly space velocities. While pure or essentially pure butene-2 may be utilized, it is possible to utilize feedstocks containing other hydrocarbons, such as other aliphatic hydrocarbons of 2 to 6 carbon atoms, as indicated further below. A sample feedstock, for instance, might contain from 3% to 65% butene-2, 3% to about 90% n-butane, 1% to about 25% butene-1, 0.01% to about 10.0% butadiene, and 0.1% to about 10% miscellaneous hydrocarbons.

It is preferred that the zeolite catalysts be "activated" in order for superior results to be obtained. "Activation" is accomplished merely by driving out the water of hydration which is present interstitially in order to open the cavities for admission of the butene-2. The activation may be carried out as a separate step or, alternately, by merely heating the catalyst or reactor contents as part of the start-up of the process. If fresh catalyst is added to a system already in operation, the temperature of the system normally is sufficient to dehydrate and activate the fresh material. An efficacious manner of activating the zeolitic catalyst is to heat the catalyst in an inert atmosphere at a temperature of about 300° C. to 350° C. for about-one-half hour before commencing the introduction of the feedstream.

The temperature of the reaction is significant and should be maintained at from about 320° C. to about 650° C. Temperatures below the indicated range, while producing butene-1, generally give poorer results. Preferred temperatures are from about 320° C. to about 575° C.

Catalytically active agents, generally "foreign" cations, may be introduced into the zeolitic crystal lattice for additional catalytic effect by any of several standard methods. One of these methods is to contact the zeolites with aqueous solutions containing the catalytically active cations. By drying the zeolite containing the solution, the catalytically active material is deposited in the channels of the zeolite. Optionally, establishment of catalytic centers can often be achieved by exchanging a portion of the Na ions of the zeolite with other metallic ions. Ions which can readily replace the Na or calcium ions or which may be deposited by solution include those of K, Li, Sr, Ni, Co, Fe, Zn, Hg, Cd, Au, Sc, Ti, V, Cr, Mn, W, Zr, Nb, Mo, and ammonium ion. Replacement may be accomplished merely by contacting the zeolitic material with a solution containing the desired ion for a sufficient time to bring about the extent of desired introduction of the ion. The percentage of exchanged material may be varied at will, and may range from about one percent up to about eighty percent. Thus, as noted, one synthetic zeolite of type 5A consists principally of a type 4A sieve in which about 75% of the Na has been replaced by Ca.

Reactors similar to those conventionally used for the dehydrogenation of hydrocarbons may be employed. The total pressure in the reactor is suitably atmospheric; however, super or subatmospheric pressures may be used. Pressures such as from about atmospheric (or below) up to about 100 to 200 p.s.i.g. may be employed. It is an advantage of the present invention that relatively high flow rates of feed may be used, in contrast to prior art processes. Good results have been obtained with flow rates of the butene-2 feed ranging from about 10 to about 30 liquid volumes of butene-2 feed per volume of the catalyst used per hour; the volumes of butene-2 being calculated as the equivalent amount of liquid hydrocarbons at standardized conditions of 15.6° C. and 760 millimeters of mercury absolute. The residence or contact time of the butene-2 in the reaction zone depends on several factors. Contact times such as about 0.001 to about 5 seconds give excellent results. Under certain conditions, higher contact times may be utilized. Contact time is the calculated dwell time of the butene-2 in the reaction zone assuming the mols of product mixture are equivalent to the mols of feed.

The above described isomerization procedure may be conducted concurrently with known dehydrogenation processes wherein hydrocarbon streams containing e.g., butane, isobutylene, pentane, butene-2, etc., are dehydrogenated to form butenes, butadiene, acetylenes, etc. The novel isomerization steps disclosed herein may also be practiced on the feedstock or portions thereof prior to the dehydrogenation reaction or on the effluent or portions thereof from the dehydrogenation reactor. Where large amounts of butene-1 in the feedstock are desired for purposes other than dehydrogenation, for example, as a polymerization feedstock, the process of the invention is preferably conducted prior to the dehydrogenation procedure, and the butene-1 separated.

The preferred feed to be dehydrogenated comprises, as noted, hydrocarbons of 2 to 6 carbon atoms and particularly monoethylenically unsaturated hydrocarbons, with or without saturated hydrocarbons mixed therewith. Especially preferred are compositions having at least 50 mol percent of monoolefins having at least four contiguous nonquarternary carbon atoms such as n-butene-1, n-butene-2, n-pentene-1, n-pentene-2, 2-methylbutene-1, 2-methylbutene-2, 3-methylbutene-1, hexene-1, and hexene-2. Other compounds readily dehydrogenated include aromatic hydrocarbons of 6 to 10 carbons such as ethyl benzene, cumene, cyclohexene, methyl cyclohexene and mixtures thereof. The preferred products are butadiene-1, 3, styrene, and isoprene.

The dehydrogenation reaction is generally carried out in the presence of catalysts, either gaseous or solid. For example, U.S. Patent 3,306,750 to Bajars discloses one process wherein chlorine is present in the reaction zone, along with other solid catalysts, and a host of solid catalytic materials have been employed by others in the field. Exemplary catalysts for the dehydrogenation include compounds of chromium, iron, molybdenum, and tungsten.

Elevated temperatures (of the order of at least about 250° C.) are required during the dehydrogenation and normally will be greater than about 300° C. or 375° C. Maximum temperatures in the reactor range to about 650° C. or 750° C. Excellent operating temperatures are within the range of about 300° C. to 650° C., as for example, from about 375° C. or 425° C. to about 600° C. or 650° C.

The total pressure during the dehydrogenation reaction may be atmospheric, superatmospheric or subatmospheric. However, relatively low total pressures are entirely suitable, such as equal to or less than 100 p.s.i.g. When the total pressure of the reaction gases during dehydrogenation is one atmosphere or greater, the partial pressure of the organic compound to be dehydrogenated during dehydrogenation will desirably be no greater than one-third of the total pressure.

The contact time of the organic compound during dehydrogenation may be varied depending upon the particular process employed. Short contact times may be utilized such as less than 2 seconds and suitably less than one second such as from .005 to 0.9 second.

In practice, if the novel isomerization steps are carried out prior to the dehydrogenation reaction, some or all of the butene-1 may be separated from the dehydrogenation feed for subsequent use in preparing polymerization grade butene-1. Alternately, all of the now butene-1 rich dehydrogenation feed may be sent into the reactor for dehydrogenation to butadiene. The isomerization steps of the present invention as a prelude to introduction of the feedstock into the dehydrogenation zone may increase the yield of butadiene, by virtue of the increased amount of butene-1 present in the reaction zone. Similarly, if the dehydrogenation reactor effluent or portions thereof are used as the feed for the isomerization step, the butene-1 product may be separated therefrom and recycled to the dhydrogenation zone to increase the concentration of butene-1 therein.

The recovery of the products of the dehydrogenation reactor is based on conventional practice and forms no part of the present invention.

Example I

A feedstream containing 54.64% trans-butene-2, 43.53% cis-butene-2, and 1.83% butene-1 was admitted into a reactor where it was contacted at a temperature of 450° C. with a molecular sieve catalyst having a chemical formula corresponding to

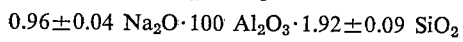

0.96±0.04 Na$_2$O·100 Al$_2$O$_3$·1.92±0.09 SiO$_2$ (type 4A), and at a liquid hourly space velocity of 15.0. Analysis of the effluent from the reactor disclosed a stream containing 50.21% transbutene-2, 40.54% cis-butene-2, and 9.06% butene-1.

Example II

The procedure of Example I was repeated except that a molecular sieve of the type 5A wherein about 75% of the Na ions (per the formula of Example I) are replaced was employed. Analysis of the effluent showed a composition containing 38.28% trans-butene-2, 31.24% cis-butene-2 and 29.53% butene-1.

Example III

The procedure of Example II was repeated except that the temperature was raised to 500° C. The effluent contained 37.28% trans-butene-2, 30.58% cis-butene-2, and 30.22% butene-1.

Example IV

The procedure of Example III was repeated except that the temperature was raised to 550° C. Analysis of the effluent disclosed a composition containing 35.10% trans-butene-2, 28.82% cis-butene-2, and 30.39% butene-1.

Example V

Example IV is repeated utilizing a feedstock containing about 5.0% butene-2, about 6.5% butene-1, about 83.8% n-butane, about 0.09% butadiene, and about 4.5% miscellaneous hydrocarbons. The effluent from the isomerization zone is sent to a dehydrogenation reactor where the stream is dehydrogenated in the presence of chromia-alumina catalyst at a temperature of about 590° C. Improved yields of butadiene-1,3 are obtained.

I claim:

1. A process for the isomerization of butene-2 to butene-1 comprising, passing butene-2 in contact with a catalyst comprising a zeolite containing an ion selected from the group consisting of Ca, Na, K, Li, Sr, Ni, Co, Fe, Zn, Hg, Cd, Au, Sc, Ti, V, Cr, Mn, W, Zr, Nb, Mo, and ammonium and mixtures thereof at a temperature of from about 320° C. to about 650° C. at a contact time with said zeolite from .001 to 5 seconds.

2. The process of claim 1 wherein the catalyst is activated by driving off water from the catalyst.

3. The process of claim 2 wherein the zeolite is selected from the group comprising sodium zeolite molecular sieves and calcium zeolite molecular sieves.

4. The process of claim 3 wherein the zeolite is a sodium aluminosilicate molecular sieve having a molecular pore size of about 4A.

5. The process of claim 3 wherein the zeolite is a calcium aluminosilicate molecular sieve having a molecular pore size of about 5A.

6. The process of claim 2 wherein the zeolite is a sodium aluminosilicate molecular sieve wherein about 75% of the sodium has been replaced by Ca.

7. The process of claim 3 wherein the catalyst contains an ion selected from the group consisting of K, Li, Sr, Ni, Co, Fe, Zn, Hg, Cd, Au, Sc, Ti, V, Cr, Mn, W, Zr, Nb, Mo and ammonium.

8. The process of claim 3 wherein the zeolite contains an ion selected from the group consisting of K, Li, Ba, Sr.

9. The process of claim 3 wherein the zeolite is selected from the group comprising zeolites having molecular pore sizes of about 4A and about 5A.

10. The process of claim 3 wherein the zeolite is selected from the group comprising zeolites having molecular pore sizes of about 10X and about 13X.

11. In a process wherein a stream containing aliphatic hydrocarbons of 2 to 6 carbon atoms, including butene-2, is sent to a dehydrogeneration zone, is contacted with a catalyst at elevated temperatures of at least 250° C. to produce hydrocarbons having greater unsaturation, and then passes from said zone, the improvement comprising, contacting a substantial portion of the stream with a catalyst comprising an activated zeolite at a temperature of from about 320° C. to about 650° C. at a contact time with said zeolite from about .001 to 5 seconds.

12. The process of claim 11 wherein the contacting occurs before the stream enters the dehydrogenation zone.

13. The process of claim 11 wherein the contacting occurs after the stream has left the dehydrogenation zone.

14. The process of claim 12 wherein the zeolite is selected from the group comprising zeolites having molecular pore sizes of about 4A and about 5A.

15. A process for the isomerization of butene-2 to butene-1 comprising passing butene-2 in contact with a catalyst comprising a type 5A molecular sieve at a temperature of about 350° C. to about 650° C. at a contact time with said molecular sieve from about .001 to 5 seconds.

References Cited

UNITED STATES PATENTS

| | | | |
|---|---|---|---|
| 3,306,750 | 2/1967 | Minsk | 96—111 |
| 3,140,322 | 7/1964 | Frilette. | |
| 2,217,252 | 10/1940 | Hogg. | |
| 3,214,487 | 10/1965 | Mattox | 260—683.2 |
| 3,308,191 | 3/1967 | Bajars. | |

DELBERT E. GANTZ, Primary Examiner

V. O'KEEFE, Assistant Examiner